United States Patent
Popp et al.

(10) Patent No.: US 7,416,071 B2
(45) Date of Patent: Aug. 26, 2008

(54) BRAKING METHOD FOR A VEHICLE

(75) Inventors: Christian Popp, Kressbronn (DE); Peter Schiele, Kressbronn (DE); Christian Schwemer, Friedrichshafen (DE); Georg Gierer, Kressbronn (DE); Klaus Steinhauser, Kressbronn (DE); Bernd Allgaier, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 393 days.

(21) Appl. No.: 10/559,515

(22) PCT Filed: May 15, 2004

(86) PCT No.: PCT/EP2004/005235

§ 371 (c)(1),
(2), (4) Date: Dec. 5, 2005

(87) PCT Pub. No.: WO2004/110804

PCT Pub. Date: Dec. 23, 2004

(65) Prior Publication Data

US 2006/0113158 A1 Jun. 1, 2006

(30) Foreign Application Priority Data

Jun. 14, 2003 (DE) .................. 103 26 839

(51) Int. Cl.
*B60W 10/10* (2006.01)
*B60W 10/18* (2006.01)
*B60W 50/02* (2006.01)

(52) U.S. Cl. ............ 192/220; 192/221; 192/219.4
(58) Field of Classification Search ............ 192/219.4, 192/220
See application file for complete search history.

(56) References Cited

U.S. PATENT DOCUMENTS

| | | | |
|---|---|---|---|
| 3,631,950 A | 1/1972 | Tanaka | |
| 3,994,374 A | 11/1976 | Gill | |
| 4,309,918 A | 1/1982 | Miller et al. | |
| 5,577,580 A | 11/1996 | Polzin et al. | |
| 6,932,440 B1 | 8/2005 | Freitag et al. | |

FOREIGN PATENT DOCUMENTS

| | | | |
|---|---|---|---|
| DE | 101 29 067 A1 | 12/2002 | |
| EP | 1 145 927 A1 | 10/2001 | |
| JP | 04321440 A | * 11/1992 | |

\* cited by examiner

*Primary Examiner*—Richard M Lorence
(74) *Attorney, Agent, or Firm*—Davis Bujold & Daniels, P.L.L.C.

(57) ABSTRACT

A braking method for a vehicle is proposed as a safety measure and replacement function if the brake system fails, in particular the X-by-wire brake system of a motor vehicle, in which the vehicle is braked with the help of the transmission by a defined engagement of frictional shift elements until the vehicle comes to rest, such that the combination of frictional shift elements actuated when the vehicle's working brake system fails does not correspond to the shift logic of a gear during normal driving operation of the vehicle.

10 Claims, 1 Drawing Sheet

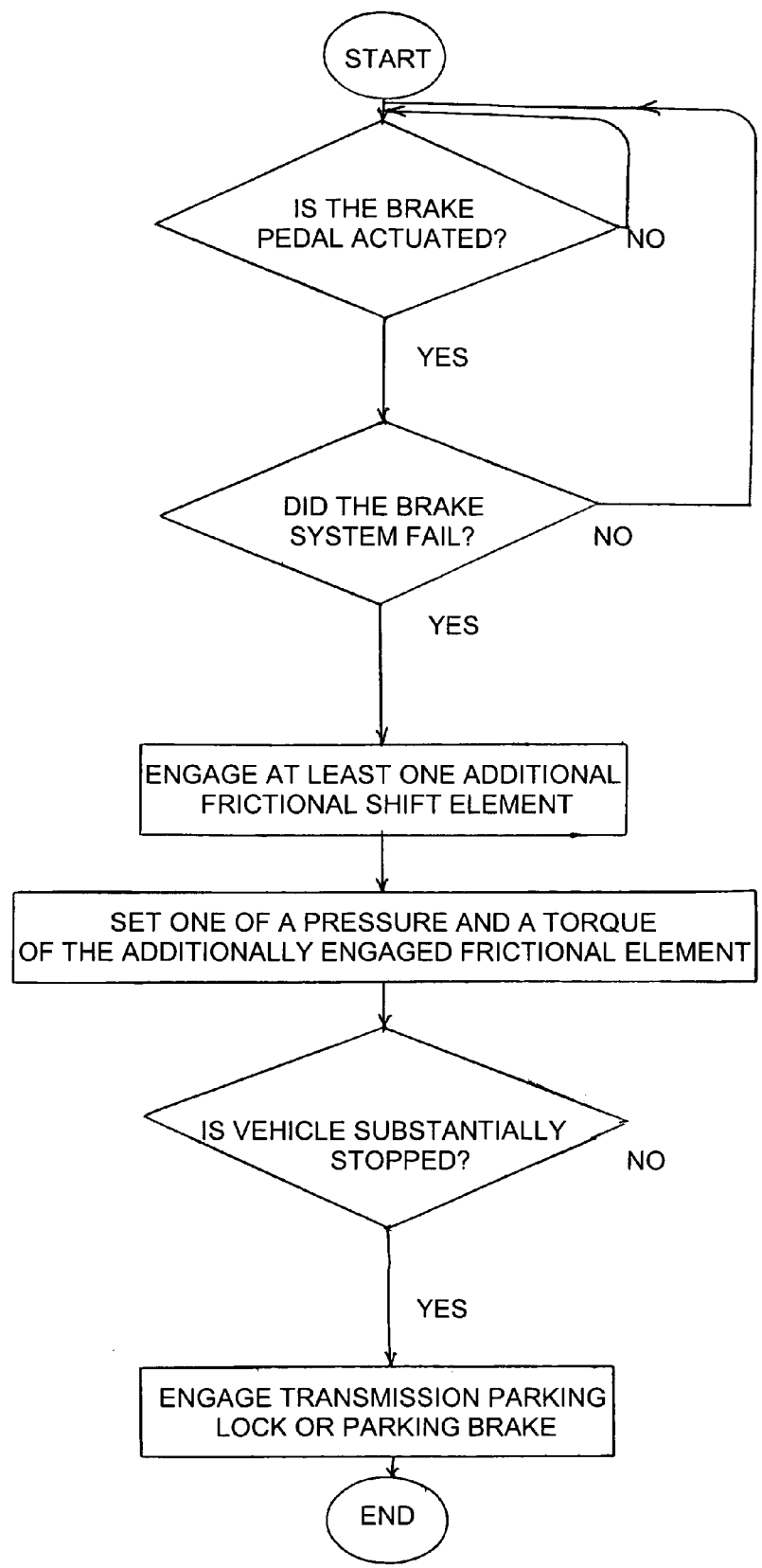

BRAKING METHOD FOR A VEHICLE

This application is a national stage completion of PCT/EP2004/005235 filed May 15, 2004 which claims priority from German Application Serial No. 103 26 839.1 filed Jun. 14, 2003.

FIELD OF THE INVENTION

The present invention concerns a braking method for a vehicle.

BACKGROUND OF THE INVENTION

The ever-increasing complexity of automatic transmissions, automated manual-shift transmissions, continuously variable transmissions, dual clutch transmissions or other safety-relevant aggregates makes ever-greater demands on the corresponding diagnosis and monitoring systems. In this context, the diagnosis and monitoring systems are primarily intended to ensure passenger protection and driving safety; further aims are to ensure that the vehicle remains available for use and to protect the transmission system and its components.

Precisely in so-termed X-by-wire braking systems, with which the driver can at times no longer intervene directly in the system, the need for safety is still greater. Particularly in X-by-wire braking systems, the automobile industry has to comply with certain standards such as DIN 19250 or DIN V 0801, since such systems do not correspond to the state of the art. This entails high expenditure on testing and monitoring software with its corresponding safety and replacement functions.

SUMMARY OF THE INVENTION

The purpose of the present invention is to indicate a braking method for a vehicle, as a safety measure and replacement function in the event that the vehicle's working brake system should fail, in particular the X-by-wire brake system of a motor vehicle, the method ensuring safe braking in certain emergency situations.

BRIEF DESCRIPTION OF THE DRAWING

The invention will now be described. by way of example. with reference to the accompanying drawing in which:

The sole FIGURE is a flow diagram showing the braking method for a vehicle.

DETAILED DESCRIPTION OF THE INVENTION

Accordingly, a braking method for a vehicle is proposed in which the vehicle is braked with the help of the transmission system by way of defined shifts of frictional shift elements (transmission clutches or transmission brakes) until the vehicle comes to rest, such that the combination of shift elements used does not correspond to the shift logic during normal driving.

According to the invention, when it is recognized that the vehicle's working brake system, for example the E-brake (X-by-wire brake) system has failed at a time when the brake pedal is actuated, the vehicle is braked in a controlled manner via the transmission by way of one or more monitoring functions. To obtain the maximum possible braking gradient of the vehicle, starting from the gear engaged in the transmission at the time, at least one additional frictional transmission element which does not correspond to the shift logic of the currently engaged gear is advantageously actuated. Thus, the resultant braking effect is not produced by a downshift initiated when the vehicle's working brake system fails, but rather by a defined load on the transmission. This can continue until the vehicle comes to rest. When the vehicle is nearly or actually at rest, a parking block of the transmission or a vehicle parking brake can also be actuated. It will be clear to those with knowledge of the field that for this, a corresponding actuation system must be provided in the transmission or in the vehicle, for example in the transmission an E-shift (shift-by-wire) with an active electric connection between the operating element (selector lever) of the transmission inside the vehicle and the parking block of the transmission.

Preferably, the frictional shift element additionally engaged compared with the normal shift logic is a brake (disk brake, belt brake, etc.) arranged within the transmission or acting on the drive output of the transmission.

Thus, to brake the vehicle if the vehicle's working brake system fails, the force flow in the transmission incorporates a defined redundancy in the sense that, by way of a software function, the torque or shifting pressure at the frictional shift element engaged additionally compared with the normal shift logic is regulated preferably in such manner that the vehicle's drive wheels undergo maximum or a specified braking. During this, however, the vehicle's drive wheels must not be locked while the current speed of the vehicle has not yet decreased to a defined value close to zero. The shifting pressure or torque to be set can be determined as a function of the brake pedal actuation force and/or the ACC-radar sensor (distance control unit) and/or the actual braking deceleration of the vehicle.

The additional braking of the vehicle by setting a defined torque/slip at the frictional shift element engaged additionally compared with normal shift logic necessarily results in increased power loss at the active frictional element, which in a worst-case situation can lead to damage. For that reason, an optional distinction is made via a further function, between emergency braking (which may cause damage to the transmission in an extreme case) and normal braking.

In a particularly advantageous variant of the present invention, a further second frictional shift element (not previously engaged) is actuated when the limiting thermal load that can be sustained by the first frictional shift element engaged to block the transmission is reached, in order to avoid damaging the transmission. A shift can also take place to another (higher or lower) gear when the limiting thermal load of the first frictional shift element engaged to block the transmission is reached in such an emergency situation of the vehicle, so that a different clutch combination can come into use for blocking the transmission in order to brake the vehicle under control.

In another embodiment of the invention, the vehicle can be additionally or alternatively braked by actuating two frictional shift elements (in particular brakes) in the transmission or a separate frictional shift element acting on the drive output of the transmission, this engagement of two brakes or of the separate shift element not corresponding to the shift logic or shift element combination for normal driving.

The method according to the invention is not limited to use in change-under-load transmissions; it can be used with continuously variable transmissions, automated shift transmissions and dual clutch transmissions.

The invention claimed is:

1. A braking method for a vehicle, for use as a safety measure and replacement function in the event that a working brake system of the vehicle fails, in which the vehicle is braked by a transmission via engagement of frictional shift elements until the vehicle is substantially at rest, and a combination of frictional shift elements engaged when the working brake system of the vehicle fails does not correspond to a shift logic of a gear during normal driving operation of the vehicle, the method comprising the steps of;

engaging at least one additional frictional shift element of the transmission, starting from a gear engaged at a time when the vehicle's working brake system fails in such manner that drive wheels of the vehicle undergo one of a maximum or a specified braking, but such that the vehicle's drive wheels are not locked while an actual speed of the vehicle is greater than a defined value, setting one of a shifting pressure or a torque of an additionally engaged first frictional shift element compared with the normal shift logic, with the set shifting pressure or torque being determined as a function of one or more of a brake pedal actuation force, a distance to another vehicle and an actual speed of the vehicle.

2. The braking method for a vehicle according to claim 1, further comprising the step of, as soon as the failure of the vehicle's working brake system is recognized, automatically braking the vehicle by the transmission.

3. The braking method for a vehicle according to claim 1 further comprising the step of, if the vehicle's working brake system fails, automatically braking the vehicle by the transmission upon actuation of a vehicle brake pedal.

4. The braking method for a vehicle according to claim 1, further comprising the step of engaging, as a function of an actual speed of the vehicle, a respective shift element combination whereby optimum or maximum vehicle braking is achieved with a least possible stress on the transmission or frictional shift elements of the transmission.

5. The braking method for a vehicle according to claim 1, further comprising the step of, when a limiting thermal load of an additionally engaged first frictional shift element, compared with normal shift logic, is reached, engaging a second additional frictional shift element of the transmission to assist with braking of the vehicle.

6. The braking method for a vehicle according to claim 1, further comprising the step of shifting to a higher or lower gear with a different combination of frictional shift elements when a limiting thermal load of an additionally engaged first frictional shift element, compared with normal shift logic, is reached.

7. The braking method for a vehicle according to claim 1, wherein the transmission further includes a separate frictional shift element acting on a drive output of the transmission and the method further comprising the step of additionally braking the vehicle by actuating at least one of another additional frictional shift element in the transmission or the separate frictional shift element acting on a drive output of the transmission.

8. The braking method for a vehicle according to claim 1, further comprising the step of, once the vehicle is substantially at rest, automatically engaging one or more of a parking lock of the transmission and a parking brake of the vehicle.

9. A braking method for a vehicle having one of a change-under-load transmission, a continuously variable transmission, an automated shift transmission or a dual clutch transmission, in the event that a working brake system of the vehicle fails, in which the vehicle is braked by a transmission by engagement of frictional shift elements until the vehicle is substantially at rest, and a combination of frictional shift elements engaged when the working brake system of the vehicle fails does not correspond to a shift logic of a gear during normal driving operation of the vehicle, the method comprising the steps of;

starting from a gear engaged at a time when the vehicle's working brake system fails, engaging at least one additional frictional shift element of the transmission in such manner that drive wheels of the vehicle undergo one of a maximum or a specified braking, but such that the vehicle's drive wheels are not locked while an actual speed of the vehicle is greater than a defined value, setting one of a shifting pressure or a torque for an additional engaged first frictional shift element, compared with the normal shift logic, with the set shifting pressure or torque being determined as a function of one or more of a brake pedal actuation force, a distance to another vehicle and an actual speed of the vehicle.

10. A braking method for a vehicle, for use as a safety measure and replacement function in an event that a brake system of the vehicle fails, the vehicle is braked by a transmission by engagement of frictional shift elements until the vehicle is substantially at rest, and a combination of frictional shift elements engaged when the working brake system of the vehicle fails does not correspond to a shift logic of a gear during normal driving operation of the vehicle, the method comprising the steps of:

engaging at least one additional frictional shift element of the transmission, starting from a gear engaged at a time when the vehicle's working brake system fails, in such manner that drive wheels of the vehicle undergo one of a maximum or a specified braking, but such that the vehicle's drive wheels are not locked while an actual speed of the vehicle is greater than a defined value, setting one of a shifting pressure or a torque for an additionally engaged first frictional shift element, compared with the normal shift logic, with the set shifting pressure or toque being determined as a function of one or more of a brake pedal actuation force, a distance to another vehicle and an actual speed of the vehicle.

\* \* \* \* \*